United States Patent
Lee et al.

(10) Patent No.: US 10,762,063 B2
(45) Date of Patent: Sep. 1, 2020

(54) COGNITIVE MOBILE APPLICATION DESIGN SEARCH ENGINE INCLUDING A KEYWORD SEARCH

(71) Applicant: International Business Machines Corporation, Armonk, NY (US)

(72) Inventors: Kyungmin Lee, Yorktown Heights, NY (US); Joe Ligman, Yorktown Heights, NY (US); Marco Pistoia, Yorktown Heights, NY (US); Stephen Wood, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 201 days.

(21) Appl. No.: 15/843,188

(22) Filed: Dec. 15, 2017

(65) Prior Publication Data

US 2019/0188287 A1 Jun. 20, 2019

(51) Int. Cl.
*G06F 16/21* (2019.01)
*G06N 20/00* (2019.01)
*G06F 16/25* (2019.01)
*G06F 16/951* (2019.01)

(52) U.S. Cl.
CPC .......... *G06F 16/211* (2019.01); *G06F 16/252* (2019.01); *G06F 16/951* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 5,933,634 A | * | 8/1999 | Enokido | G06F 8/33 715/234 |
| 7,493,557 B2 | * | 2/2009 | Shima | G06F 40/166 715/255 |
| 8,719,229 B1 | * | 5/2014 | Awe | G06F 16/1873 707/649 |
| 8,813,028 B2 | | 8/2014 | Farooqi | |
| 8,898,629 B2 | | 11/2014 | Hirsch et al. | |
| 9,104,450 B2 | | 8/2015 | Schein et al. | |
| 9,448,776 B1 | | 9/2016 | Sankaran et al. | |

(Continued)

FOREIGN PATENT DOCUMENTS

WO WO-2019090072 A1 * 5/2019 ......... G06F 17/5009

OTHER PUBLICATIONS

Reiss, Steven P., "Seeking the User Interface," Proceedings of the 29th ACM/IEEE International Conference on Automated Software Engineering, pp. 103-114, ACM, 2014.

(Continued)

*Primary Examiner* — Uyen T Le
(74) *Attorney, Agent, or Firm* — Anthony R. Curro, Esq.; McGinn IP Law Group, PLLC

(57) ABSTRACT

A mobile application design search method, system, and computer program product include detecting a feature in an uploaded design source files, generating keywords that describe each feature for design screens in the design source files, and creating a database including the feature and the keywords associated with the feature to enable a keyword search for a type of the feature that can be reused in a new application design source file.

20 Claims, 8 Drawing Sheets

(56) References Cited

U.S. PATENT DOCUMENTS

| | | | |
|---|---|---|---|
| 2003/0200532 A1* | 10/2003 | Gensel | G06F 8/36 717/120 |
| 2010/0114939 A1* | 5/2010 | Schulman | G06F 11/3672 707/769 |
| 2015/0379064 A1* | 12/2015 | Xin | G06F 16/2365 707/687 |
| 2015/0379166 A1* | 12/2015 | Xin | G06F 17/18 703/2 |
| 2017/0032050 A1 | 2/2017 | Kol et al. | |

OTHER PUBLICATIONS

Nguyen, Tuan Anh et al., "Reverse Engineering Mobile Application User Interfaces with REMAUI," 2015 30th IEEE/ACM International Conference on Automated Software Engineering (ASE), pp. 248-259, IEEE, 2015.

Deka, Biplab, et al., "ERICA: Interaction Mining Mobile Apps," Proceedings of the 29th Annual Symposium on User Interface Software and Technology, pp. 767-776, ACM, 2016.

Dekam Biplab, et al., "Rico: A Mobile App Dataset for Building Data-Driven Design Applications," Proceedings of the 30th Annual ACM Symposium on User Interface Software and Technology, pp. 845-854, ACM, 2017.

Lamberti, Fabrizio, et al., "Extensible GUIs for Remote Application Control or Mobile Devices," IEEE Computer Graphics and Applications 28, No. 4, pp. 50-57, 2008.

Mel, et al. "The NIST Definition of Cloud Computing". Recommendations of the National Institute of Standards and Technology. Nov. 16, 2015.

\* cited by examiner

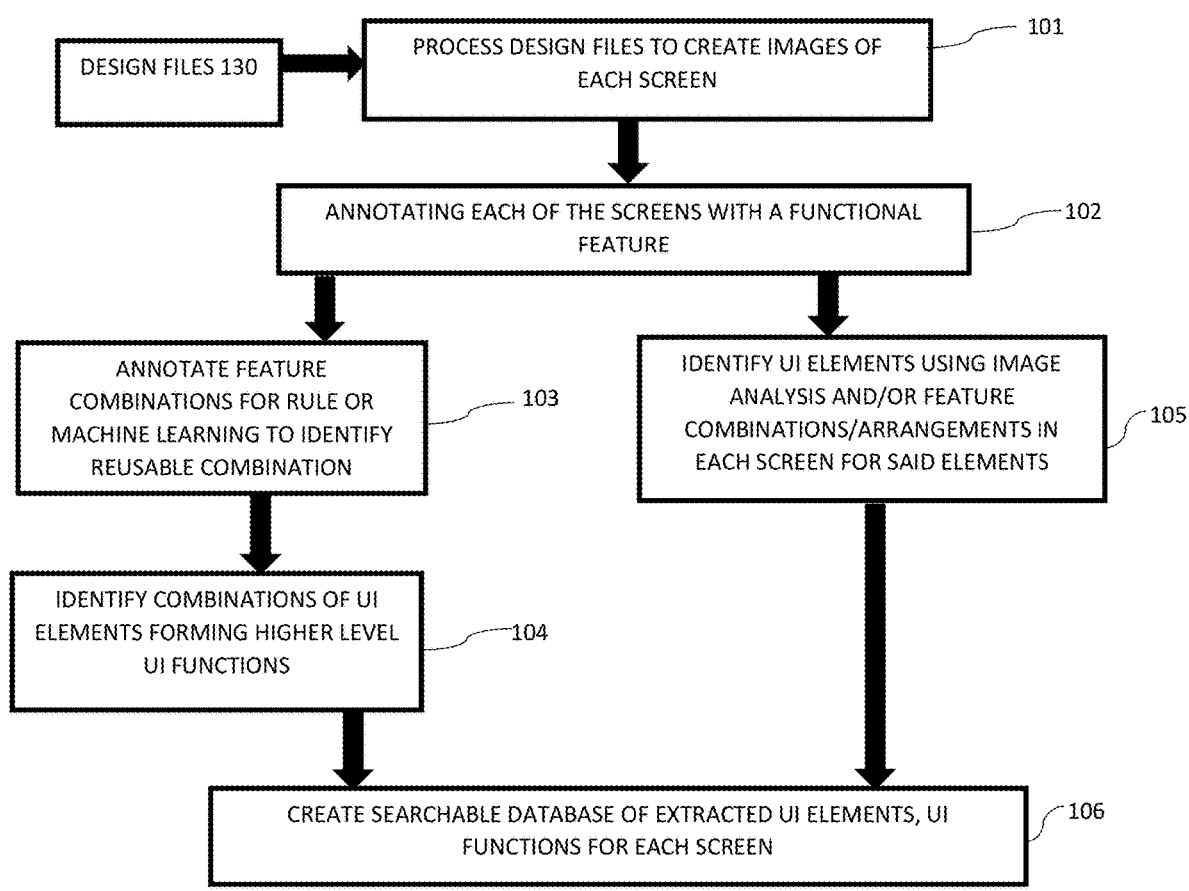

COGNITIVE MOBILE APPLICATION DESIGN SEARCH ENGINE INCLUDING A KEYWORD SEARCH

CROSS REFERENCE TO RELATED APPLICATIONS

The present application is related to U.S. patent application Ser. No. 15/828,329, filed on Nov. 30, 2017, the entire contents of which are incorporated herein by reference.

TECHNICAL FIELD

The present invention relates generally to a mobile application design search method, and more particularly, but not by way of limitation, to a system, method, and computer program product for providing users the ability to search for specific user interface (UI) elements and keywords and download the corresponding source design tiles that can be reused in the application design process.

SUMMARY

In an exemplary embodiment, the present invention can provide a computer-implemented mobile application design search method, the method including detecting a feature in an uploaded design source files, generating keywords that describe each feature for design screens in the design source files, and creating a database including the feature and the keywords associated with the feature to enable a keyword search for a type of the feature that can be reused in a new application design source file.

One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 1 exemplarily shows a high-level flow chart for a mobile application design search method 100 according to an embodiment of the present invention;

DETAILED DESCRIPTION

Figure 2A:
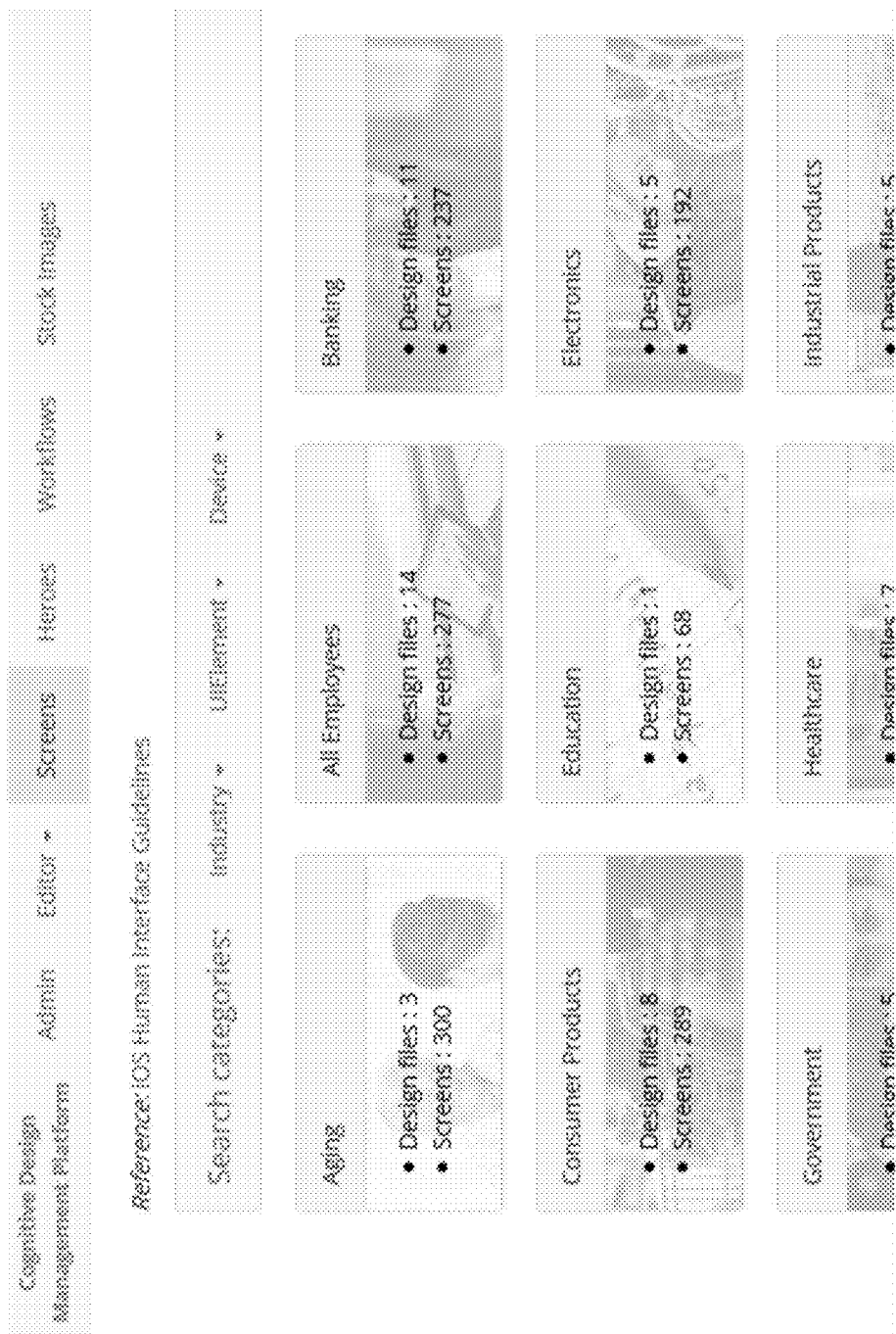
FIGS. 2A-2D exemplarily show a flow from a viewpoint of an end-user of a system according to the present invention as the end-user searches for and locates design elements in a screen that may be of help to them for the UI design of a new application.

The invention will now be described with reference to FIGS. 1-5, in which like reference numerals refer to like parts throughout. It is emphasized that, according to common practice, the various features of the drawings are not necessarily to scale. On the contrary, the dimensions of the various features can be arbitrarily expanded or reduced for clarity.

Conventionally, websites rely on mobile application designers to upload their designs as an image and annotate their designs with appropriate tags (e.g., a screen with comments, a screen with photos, a payment screen, etc.). Once a database is populated with design images and annotated tags, other designers can search this database to find designs that they can use (and re-use). Once designers find the relevant design files for them (e.g., designs in a similar application area, contains similar functionality, etc.), they can download or view such design images as a reference. Unfortunately, if designers want to reuse any of portion of searched designs in their designs, the designers must re-implement the same design from scratch. Embodiments of the present invention cover a method, computer program product and a system for mobile application design search.

By way of introduction of the example depicted in FIG. 1, an embodiment of a mobile application design search method 100 according to the present invention can include various steps for processing design files of application graphical user interfaces (GUIs) to allow automatic detection of user interface (UI) Elements.

Figure 3:
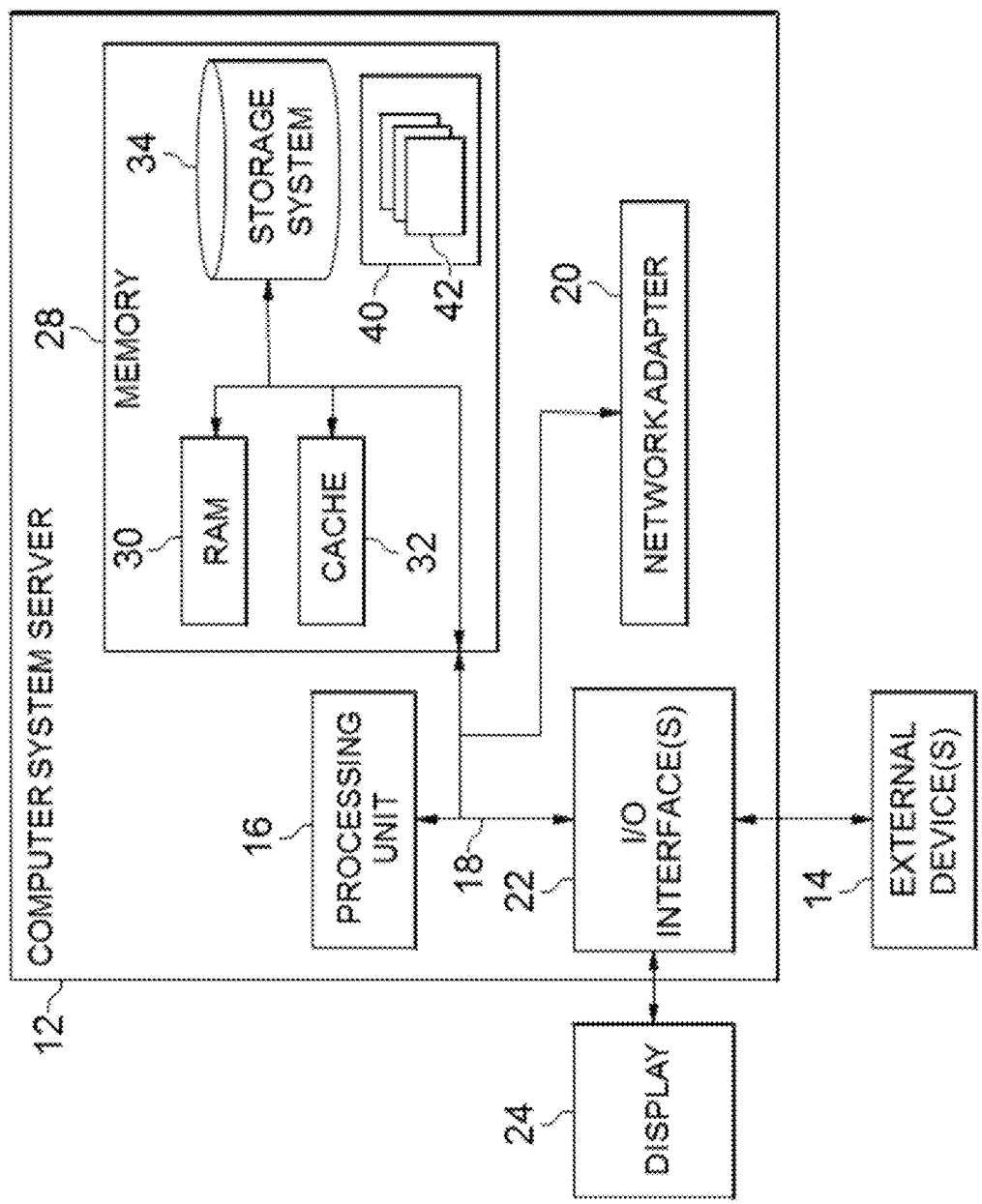
FIG. 3 depicts a cloud-computing node 10 according to an embodiment of the present invention.

By way of introduction of the example depicted in FIG. 3, one or more computers of a computer system 12 according to an embodiment of the present invention can include a memory 28 having instructions stored in a storage system to perform the steps of FIG. 1.

Figure 2B:
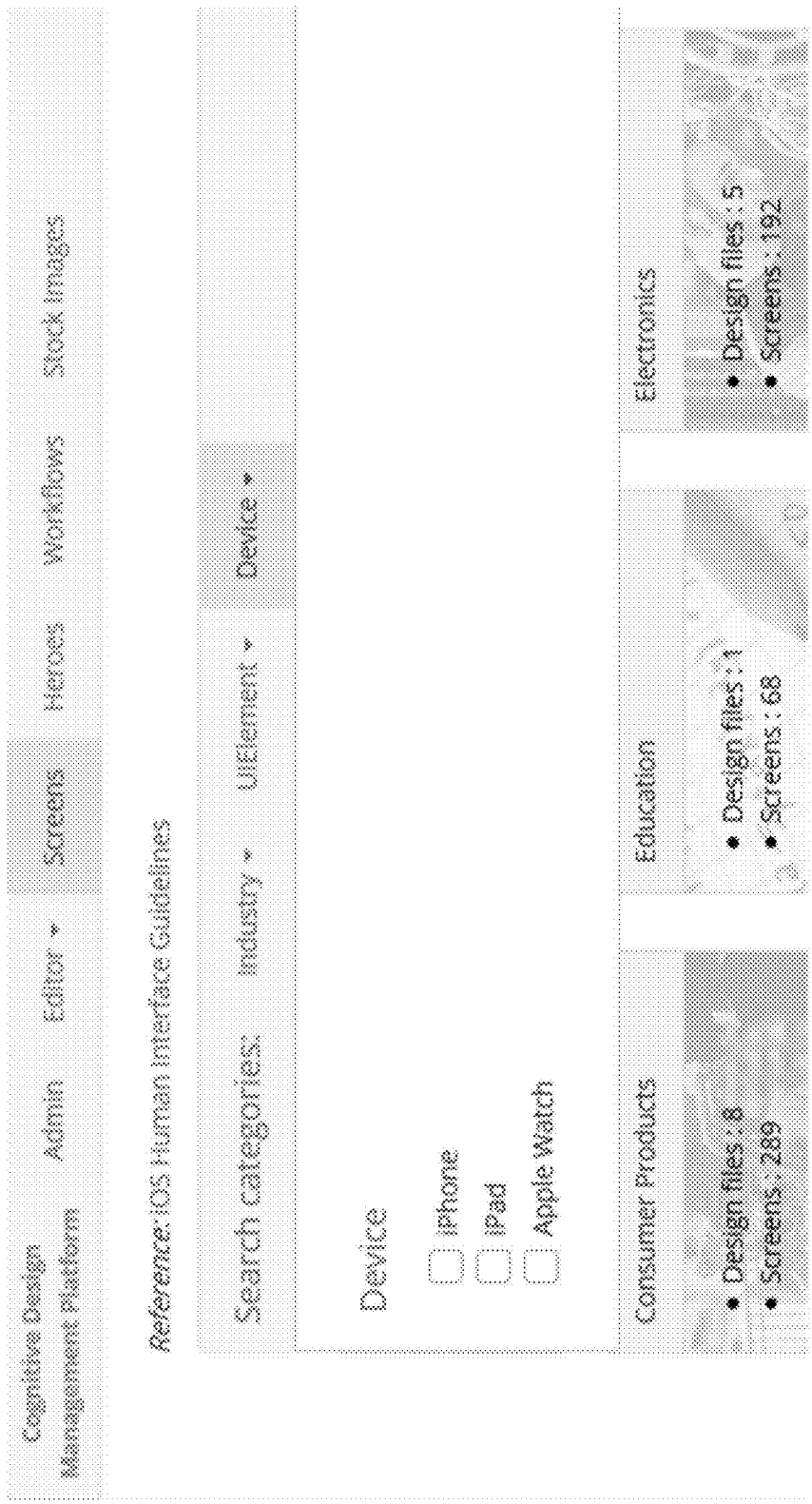
Figure 2C:
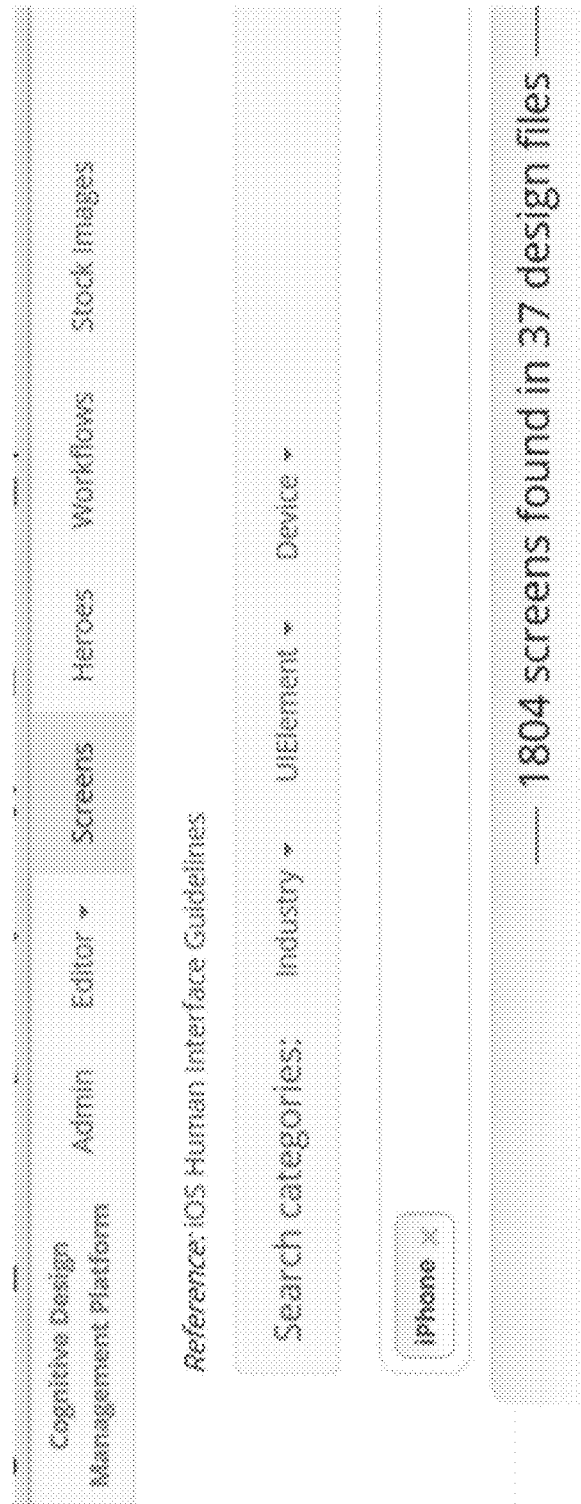
Figure 2D:
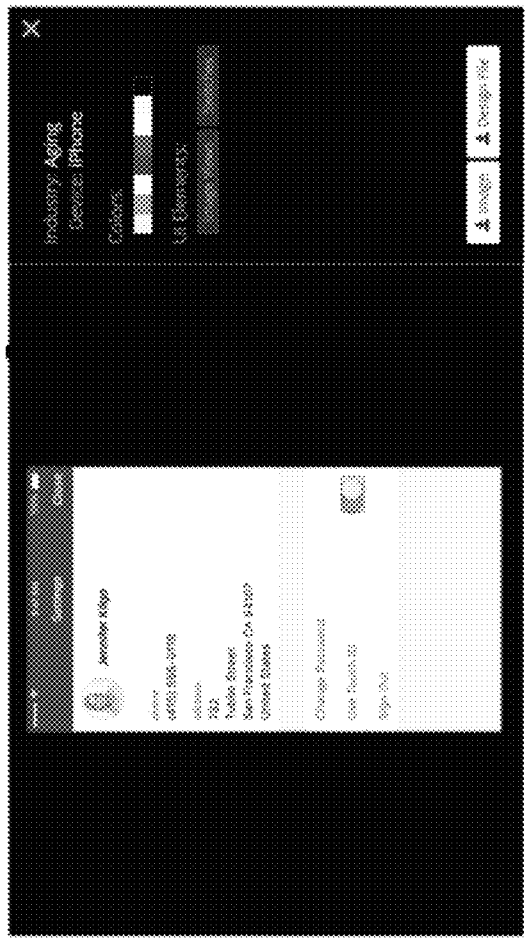

With reference now generally to FIGS. 1-2D, design files of GUIs are processed via method 100 to allow automatic detection of UI elements (e.g., buttons, sliders, color schemes, edit boxes, etc.), within each application screen contained in the design file, as well as combinations thereof forming higher level function such as login, payment or account creation functionalities. In other words, a syntactical approach is taken for finding individual elements of a screen via a search of keywords. An application can then be created to allow designers to easily navigate the resultant database and permit search for UI elements, UI function, etc.

With reference to FIG. 1, a method 100 is exemplarily depicted for creating a database that is searchable for features from a screen of a design file.

In step 101, UI design files are processed to identify each screen and create images of each screen and exported as suitable machine readable format for feature extraction. That is, each screen and an image of each screen in the design file is extracted such that features (e.g., buttons, sliders, colors, etc.) can be extracted from each screen. It is noted that a connection from one screen to another is not maintained since only individual elements on a single screen are going to be extracted in the next steps.

In step 102, the screens are annotated to identify the features on the screen. In other words, the screens are annotated by, for example, marking all UI elements, for input for rule creation for rule-based detection and/or machine learning to allow identification of such features. The features can be categorized by industry (e.g., banking, automotive, insurance, and retail), device (e.g., smartphone, watch, tablet, and TV), a presence of one or more UI elements (e.g., action sheets, buttons, menus, and notifications), color palette (e.g., blue, orange, and green), etc. The detection of UI elements from design files is based on rules and/or machine learning.

In step 103, feature combinations are annotated for rule-based detection and/or machine learning to identify useful reusable combinations (e.g. login function, payment function). In other words, the screens are analyzed in order to identify a feature or feature combination. That is, the features are identified with natural language in order to be searchable in the database. For example, the invention might detect using rule-based and/or machine learning. If an expert can provide rules then the invention can use those. However, the invention can also use any patterns the machine learning would find. And, the invention could use both techniques in learning phase if desired.

In step 104, for each screen, combinations of UI elements forming higher level UI functions such as login, payment, shopping cart, etc. are identified. For example, a payment button can be identified as a UI element including a color scheme and a clickable button, or as a UI element including a slider bar and a check box, etc.

In step 105, for each screen in design file, UI elements are identified using rules and/or image analysis and/or feature combinations/arrangements in design file for the elements. For example, if a screen has a color scheme, a slider bar, a checkout button, etc., these elements are identified using image analysis and/or the feature combinations/arrangements from steps 103-104. That is, keywords are extracted that represent each design screen by performing cognitive analysis on text, UI elements, and embedded images that are present in the design. This can be performed based on Natural Language Processing (NLP).

In step 106, a searchable 'database' is created of extracted UI elements, UI functions for each design file. Therefore, in steps 101-104, a mobile application design search database is created by automatically detecting UI elements, colors, and texts from uploaded design source files, performing cognitive analysis to generate keywords that describe each design screen, and allowing users to search for specific elements and keywords, and download the source design files that can be reused in their design process.

Thus, the method 100 can provide a database for designers to reuse other design files with minimal effort and provide fir users to download individual images or design files, and edit/copy them in order to compose new designs. In one embodiment, the invention can let the user download the entire original design file as it was originally uploaded that contains the screen/UI element(s) of interest. Or, if the design format is known, the invention can offer just that part of the design that the search located that was of interest. The latter would be an entire design file too by virtue of it being self-contained but it would not be the entire original design file in which that aspect of interest was found.

That is, in one exemplary embodiment, the invention starts with a design file (or a set of them when building the database from scratch). Now it maybe that the design file in its "natural" form is hard to process as it likely to be a proprietary binary format. But, like many tools they offer export into other formats—such as SVG, a Standard Vector Graphic format that is text based. In order to process the file, the invention can, for example, look at the design itself—often done using vector graphics to keep things scalable or export/capture each screen as an image. Both processing can be automatically performed.

With the design, the invention can use rules that define UI elements, use machine learning to understand how the fundamental elements (vectors i.e. lines, fills etc.) in the design file to build up UI elements. This can include textual analysis too. The invention can also use visual and textual analysis on the screen image corresponding to the design of that screen. Thus, the invention has the design as well the screen image and can use both as needed to help identify UI components. During the initial phase where the invention might be training machine learning we would use manually annotations to assist that learning—i.e. annotations for the UI Elements in the screens to allow the machine learning to be able to identify these by learning from the examples provided.

Once the engine can recognize the UI elements, whether by rules we provided that were expertly created and/or via machine learning etc., then design files can be processed and within each screen the constituent UI elements can be found and attributes relevant to the design file/screen/UI element can be added to the database to allow for later search.

Now the screen images are created by the invention that can be used for visual analysis, are also what we provided back to a user of the search engine as part of the search results when looking for UI elements. To that end the images have a dual-purpose.

In addition to being able to learn to find single UI elements, the invention can train/learn combinations of controls within a single screen where the combinations has some high level meaning/significance—e.g., login function, payment function etc. i.e. some logical grouping of more than one UI element in a single screen.

FIGS. 2A-2D exemplarily depict outputs of screenshots of such an application. The FIGS. 2A-2D depict a flow from the viewpoint of an end-user of the design re-use system as they search for and locate design elements that may be of help to them for the UI design of a new application. Here also design files have been logically grouped by the industry in the database for which the application was designed. Designs are also characterized by the platform and device upon which the application will finally run (i.e., Windows™, Android™, iOS™, etc.). It is noted that the invention can categorize both according to the platform (OS) as well as the device. For instance, on iOS platform, the invention can distinguish iPhone device from iPad and from Apple Watch. The invention can even distinguish versions of OS as applicable as well device types such as the different iPhone form factors. Designs changes over time with newer designs emerging with new/changed capability on newer platforms/devices hence it can be desirable for a designer to want to limit a search.

An application may have more than one design to cater for unique experiences on the different devices where they have different capabilities. For example, larger screens may permit richer more detailed information to be shown than on a smaller device and require a rather different UI design to accommodate that.

FIG. 2A exemplarily depicts one screenshot showing the ability to search for application design screens by industry, UI element and device (i.e., search the database via keywords). As the set of features are extracted and hence known a priori the user can choose from selections in drop down menus to locate design elements of interest.

As shown in FIG. 2B, design elements can be chosen from the set of designs for particular device. FIG. 2C exemplarily depicts screens from designs for applications that target the iPhone™ were found and are now shown. More search categories may be added as desired to focus in more specifically for designs.

And, FIG. 2D exemplarily depicts a more detailed search of the database via keywords. That is, more detail may then be seen for any given screen such that UI elements are shown and colors used therein as a palette. In the GUI shown in FIG. 2D, the Switches UI Elements has been selected in the right-hand side panel and the corresponding UI elements in the design screen are highlighted by an outline. If the design is of interest, then it may be downloaded as either an image for reference in a new design or as a design file for more direct re-use.

Therefore, the created database can allow for application UI design elements reuse, feature extraction of UI designs, machine learning of UI design elements, and a searchable database for UI design elements by function. That is, the invention can find UI elements of different types, style, etc., that are spatially related e.g. a button spatially near a slider. For example, one might look for action sheets if one is not sure how they are used/styled. One can also look by function and do a search for 'pressure' to find controls or screens that might relate to what one wants which is to show a patient's blood pressure.

Thus, for processing and extracting UI Elements, the invention can do so with two approaches. Some rules for the extraction engine can be created that told it what to look for in order to identify UI Elements. Also, each screen is annotated to identify each UI Element as training material for machine learning to identify UI Elements which includes visual and textual analysis to extract features that can also be used by the learning, in addition to whatever features exist in the design file itself (which is mainly vector based drawing elements i.e., lines, fills etc.). For example, a rule that said how to look for a button might be a rectangle with centered text—or other ways of expressing the same such as a closed set of four lines with centered text. What these rules look like would be dependent on the engine used. The machine learning can go off the design file (usually an exported form) as well as the captured screen images from the file.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
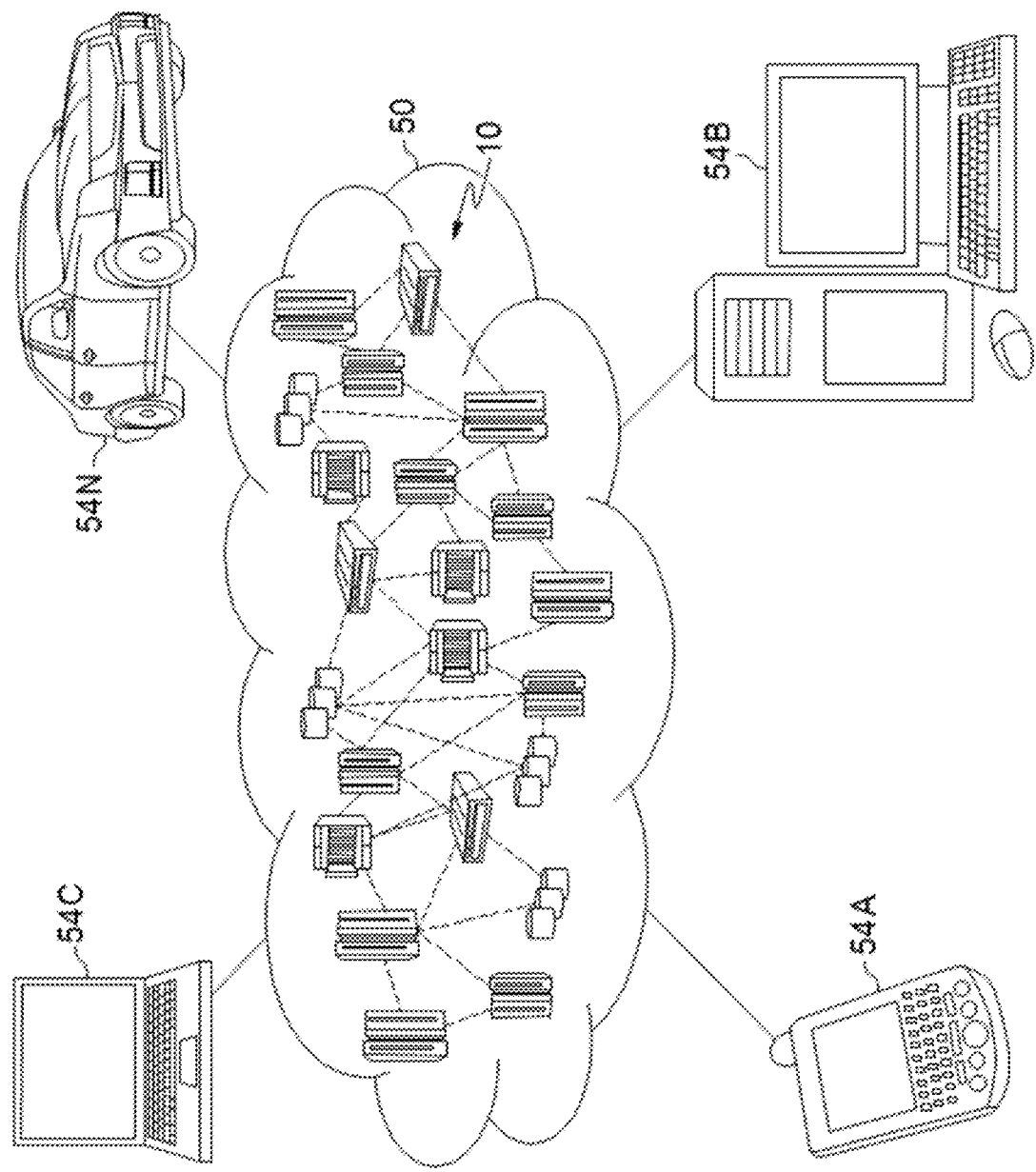
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
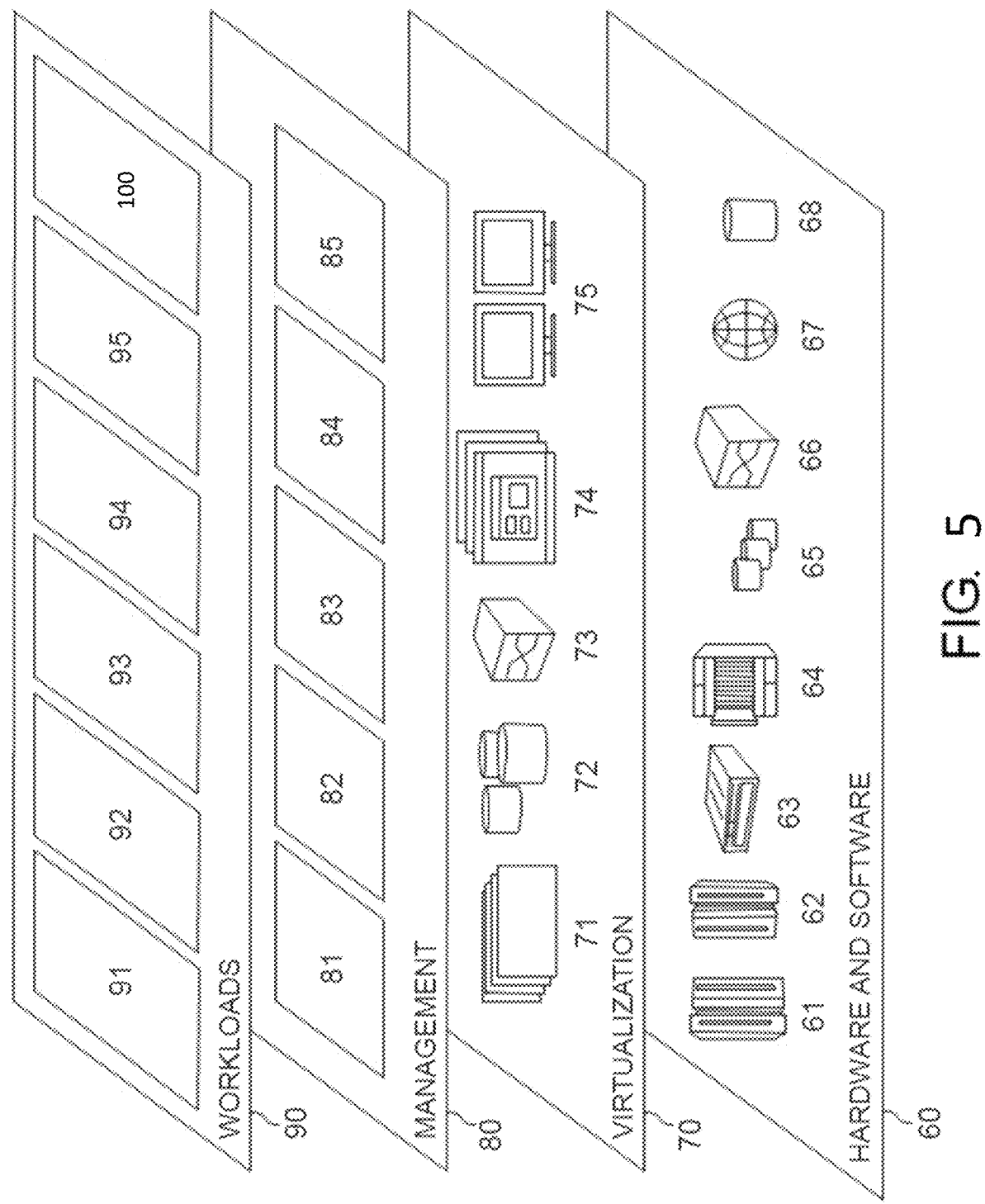
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstract layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile application design search method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry; or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented mobile application design search method, the method comprising:
    detecting a feature of a design screen in an uploaded design source file, the feature being a reusable element of the uploaded design source file and the feature being reusable in a new application design source file;
    extracting a source code of the feature that is independently extractable from the uploaded design source file;
    generating keywords that describe the feature of the design screen in the design source file;
    creating a database including the feature, the source code of the feature, and the keywords associated with the feature to enable a keyword search for the feature to reuse the feature in the new application design source file; and
    downloading the source code of the feature from the database to combine with the new application design source file such that the feature is copied to the new application design source file, thereby eliminating a recodification of the feature.

2. The computer-implemented method of claim 1, wherein the feature comprises at least one of:
    a user interface (UI) element;
    a color scheme; and
    text.

3. The computer-implemented method of claim 1, wherein the generating converts the feature into a natural-language based keyword searchable in the database.

4. The computer-implemented method of claim 1, wherein the detecting processes the design source file which has been converted to a machine-readable format for the feature detection.

5. The computer-implemented method of claim 1, wherein the detecting detects the feature by marking User Interface (UI) elements of each screen for input for one of a rule-based detection and machine learning for identification of the feature.

6. The computer-implemented method of claim 5, wherein, for each screen in the design file, the features are identified using one of image analysis and a feature combination. in the design file for the UI elements, the keywords being generated based on the identified features.

7. The computer-implemented method of claim 6, wherein the feature combinations are annotated for a rule or a machine learning to identify reusable feature combinations.

8. The computer-implemented method of claim 1, embodied in a cloud-computing environment.

9. A mobile application design search system, said system comprising:
    a processor; and
    a memory, the memory storing instructions to cause the processor to perform:
        detecting a feature of a design screen in an uploaded design source file, the feature being a reusable element of the uploaded design source file and the feature being reusable in a new application design source file;

extracting a source code of the feature that is independently extractable from the uploaded design source file;

generating keywords that describe the feature of the design screen in the design source file;

creating a database including the feature, the source code of the feature, and the keywords associated with the feature to enable a keyword search for the feature to reuse the feature in the new application design source file; and downloading the source code of the feature from the database to combine with the new application design source file such that the feature is copied to the new application design source file, thereby eliminating a recodification of the feature.

10. The system of claim 9, wherein the feature comprises at least one of:
a user interface (UI) element;
a color scheme; and
text.

11. The system of claim 9, wherein the generating converts the feature into a natural-language based keyword searchable in the database.

12. The system of claim 9, wherein the detecting processes the design source file which has been converted to a machine-readable format for the feature detection.

13. The system of claim 9, wherein the detecting detects the feature by marking User Interface (UI) elements of each screen for input for one of a rule-based detection and machine learning for identification of the feature.

14. The system of claim 13, wherein, for each screen in the design file, the features are identified using one of image analysis and a feature combination in the design file for the UI elements, the keywords being generated based on the identified features.

15. The system of claim 14, wherein the feature combinations are annotated for a rule or a machine learning to identify reusable feature combinations.

16. The system of claim 9, embodied in a cloud-computing environment.

17. A computer program product for mobile application design search, the computer program product comprising a computer-readable storage medium having program instructions embodied therewith, the program instructions executable by a computer to cause the computer to perform:

detecting a feature of a design screen in an uploaded design source file, the feature being a reusable element of the uploaded design source file and the feature being reusable in a new application design source file;

extracting a source code of the feature that is independently extractable from the uploaded design source file;

generating keywords that describe the feature of the design screen in the design source file;

creating a database including the feature, the source code of the feature, and the keywords associated with the feature to enable a keyword search for the feature to reuse the feature in the new application design source file; and downloading the source, code of the feature from the database to combine with the new application design source file such that the feature is copied to the new application design source file, thereby eliminating a recodification of the feature.

18. The computer program product of claim 17, wherein the feature comprises at least one of:
a user interface (UI) element;
a color scheme; and
text.

19. The computer program product of claim 17, wherein the generating converts the feature into a natural-language based keyword searchable in the database.

20. The computer program product of claim 17, wherein the detecting processes the design source file which have been converted to a machine-readable format for the feature detection.

* * * * *